United States Patent [19]

Kaaden

[11] Patent Number: 5,978,193
[45] Date of Patent: Nov. 2, 1999

[54] SWITCHGEAR UNIT CAPABLE OF COMMUNICATION

[75] Inventor: Peter Kaaden, Schwandorf, Germany

[73] Assignee: Siemens Aktiengesellschaft, München, Germany

[21] Appl. No.: 08/983,055

[22] PCT Filed: May 24, 1996

[86] PCT No.: PCT/DE96/00912

§ 371 Date: Dec. 8, 1997

§ 102(e) Date: Dec. 8, 1997

[87] PCT Pub. No.: WO96/42188

PCT Pub. Date: Dec. 27, 1996

[30] Foreign Application Priority Data

Jun. 8, 1995 [DE] Germany ............................ 195 21 001

[51] Int. Cl.⁶ .................................. H02H 3/00; H01R 9/26
[52] U.S. Cl. ............................................. 361/64; 439/716
[58] Field of Search ................................ 361/114, 62, 64, 361/67, 69, 752; 439/76.1, 716; 335/132, 202; 200/307

[56] References Cited

U.S. PATENT DOCUMENTS 5,000,692  3/1991  Taniguchi et al. ....................... 439/716
5,541,810  7/1996  Donhauser et al. ..................... 361/686

FOREIGN PATENT DOCUMENTS

| 0 236 711 | 9/1987 | European Pat. Off. . |
| 0 499 675 | 8/1992 | European Pat. Off. . |
| 28 10 071 | 9/1979 | Germany . |
| 36 28 835 | 3/1988 | Germany . |
| 36 33 785 | 4/1988 | Germany . |
| 89 10 111 | 11/1989 | Germany . |
| 43 05 746 | 9/1994 | Germany . |
| 43 21 981 | 1/1995 | Germany . |
| WO 94/24647 | 10/1994 | WIPO . |

OTHER PUBLICATIONS

Rohrbacher, Gebäude–Systemtechnik und Gebäudeautomation, etz, Bd 115, pp. 1344–1348 (1994).

*Primary Examiner*—Ronald W. Leja
*Attorney, Agent, or Firm*—Kenyon & Kenyon

[57] ABSTRACT

In a switchboard with a databus, a simple apparatus for providing electrical contact with switching devices used with electronics for communication. A switching device unit with a communication capability has an equipment mount that is used for mounting. The equipment mount includes a plurality of switching devices mounted on a standard profile rail, as well as a communication unit which is held on the equipment mount and has plug contacts through which the electrical drive for the switching devices is provided.

10 Claims, 6 Drawing Sheets

SWITCHGEAR UNIT CAPABLE OF COMMUNICATION

BACKGROUND OF THE INVENTION

1. Field of the Invention

The present invention relates to switching devices in a switchboard, which can communicate with one another via a databus, or can communicate with a higher-level programmable logic controller (PLC).

2. Description of the Prior Art

Systems with switching devices, including the associated control and, possibly, measurement devices, as well as control-unit and display devices, which can be coupled via bus-compatible coupling elements to a databus, for example a two-wire bus, have been disclosed in WO-94/24647. In that publication, the normal control wiring is avoided. The databus has connected to it an interface assembly, which is connected via a serial transmission bus to a communication processor of a programmable logic controller. The interface assembly has a microprocessor with a control program which, with an appropriate configuration, allows the switchboard to be operated as an independent functional island— that is to say, a closed system. Furthermore, higher-level action on the control of the switching, control and measurement devices is possible by the communication processor, which may be located remotely. This system design relieves higher-level systems, such as the programmable logic controller, of control functions, by the communication processor, the protective function is locally decoupled and thus accelerated, and it is possible for the system switchboard to have a defined behavior in the event of failure of the transmission bus.

SUMMARY OF THE INVENTION

There is a user requirement for simple handling, which allows the switching devices described above to be commissioned quickly and reliably, including communication.

The present invention is thus based on the object of providing, for a switchboard with a data bus, simple adaptation of and electrical contact with switching devices in conjunction with electronics that are required for communication.

This object is achieved according to the present invention by a switching device unit with a communication capability. This switching device unit has an equipment mount on which a plurality of electromagnetically operated switching devices, for example contactors, overload relays and power breakers, can be adapted via a top-hat rail. Furthermore, this switching device unit contains a communication unit, which is held on the equipment mount and has plug contacts via which the electrical drive for the switching devices is possible.

In one advantageous embodiment, the equipment mount is provided with electrical first contacts and snap-action connection in such a manner that, when snapped onto the standard profile rail, the first contacts automatically make contact with data and supplies lines which are integrated in said standard profile rail.

Simple electrical connection of the switching device unit is achieved if the equipment mount is provided at the rear with electrical connections for electrical connection to busbars as main current bars, to which electrical loads can be connected via the switching devices.

For supplying electrical power and for data traffic, it is advantageous if a plug-in slot for the connection of a bus connector is provided on the communication module.

BRIEF DESCRIPTION OF THE DRAWINGS

A number of exemplary embodiments of the invention are explained in more detail in the following text with reference to the drawings, in which.

DETAILED DESCRIPTION OF THE INVENTION

Figure 1:
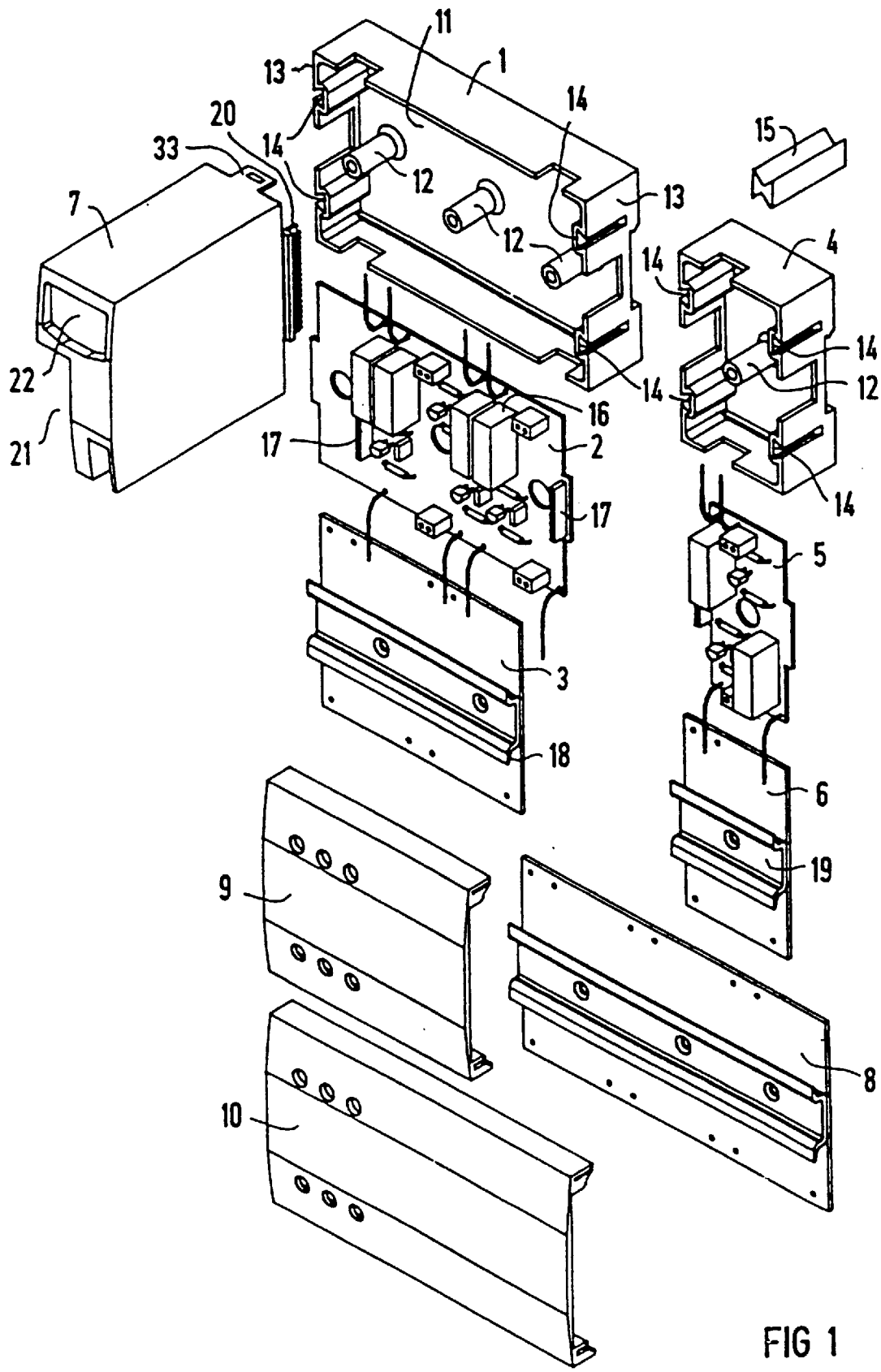
FIG. 1 shows an exploded view of the switching device unit according to the invention.

The switching device unit with a communication capability illustrated in FIG. 1 contains an equipment mount 1, a printed circuit board 2, a covering panel 3, a communication module 7, switching devices (which are not illustrated in FIG. 1), and a front cover 9.

The switching device unit can be expanded with the aid of an equipment mount expansion part 4, a printed circuit board expansion part 5, an additional covering panel 6 or an extended covering panel 8, and an adapted front cover 10.

The equipment mount 1 is designed in the shape of a trough and has pins 12 projecting on its inside from the base 11. There are dovetail-shaped recesses 14 on the side walls 13 of the equipment mount 1. The equipment mount expansion part 4 is designed in a corresponding manner, and can be coupled to the equipment mount 1 by a dovetail-shaped adaptor 15, via the correspondingly designed recesses 14.

The printed circuit board 2 has an electrical circuit, for example with power amplifiers 16 and input circuitry, for interrogating the switching state of the switching devices. Furthermore, the printed circuit board 2, which is mounted via the pins 12 of the equipment mount 1, has arranged on it a strip connector 17 that is connected to the circuit.

The printed circuit board 2 is protected on the side opposite the base 11 of the equipment mount 1 by the covering panel 3, on which a top-hat rail 18 is integrated. Two switching devices, for example contactors, overload relays and power breakers, can be snapped onto the top-hat rail 18.

If a further switching device is required, the equipment mount 1 is expanded by the equipment mount expansion part 4 with the printed circuit board expansion part 5 and the associated additional covering panel 6 with the top-hat rail part 19 (or the covering panel 8).

Figure 5:
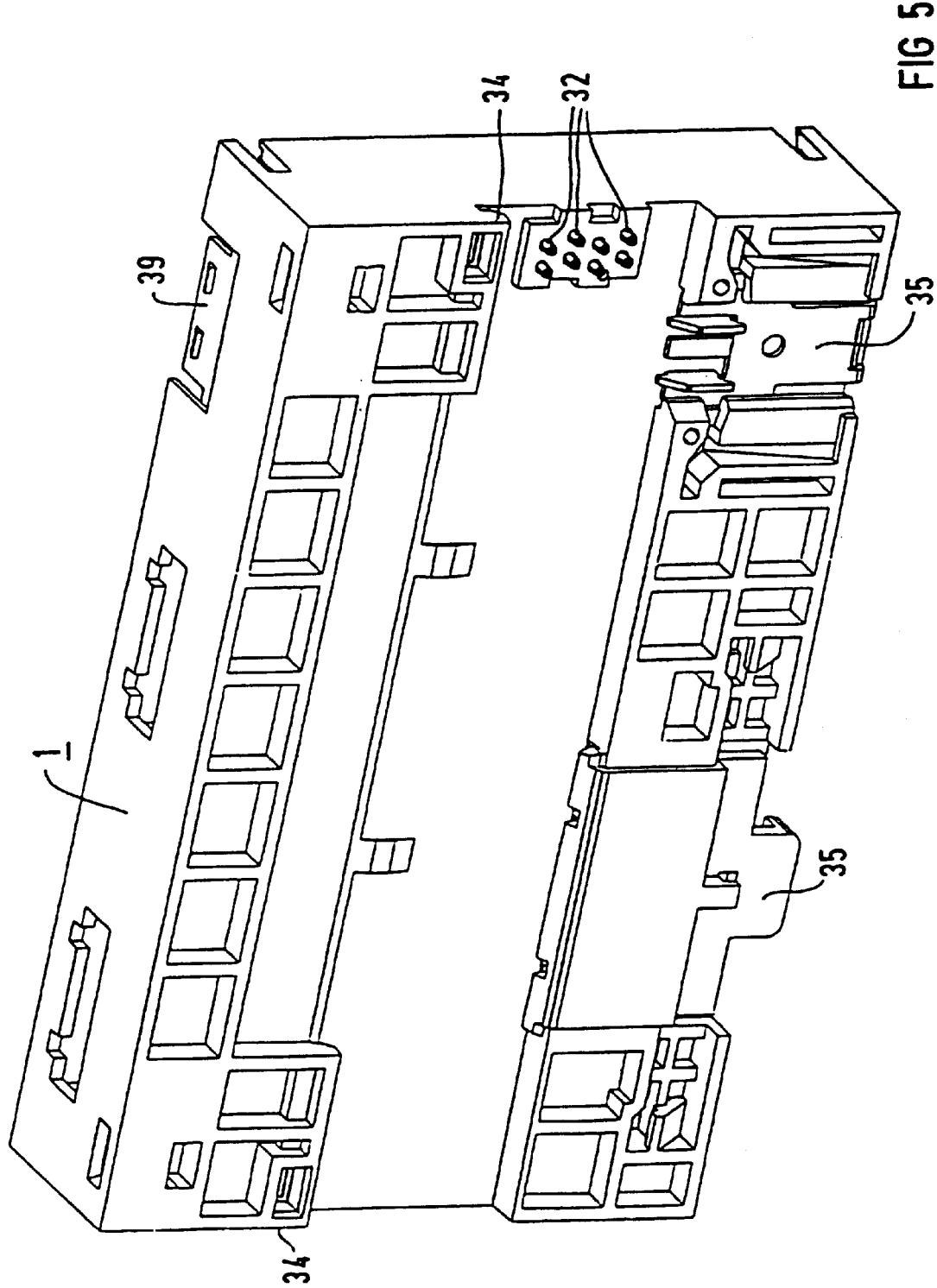
FIG. 5 shows the rear of the switching device unit according to FIG. 4.

The communication module 7 can be plugged on the equipment mount 1 via detachable latch 33, contact at the same time being made between a male strip connector 20 at the rear or module 7 and the strip connector 17 on the printed circuit board 2. As a mating element, the equipment mount 1 has a plug-in snap-action lug 39 for latching (FIG. 5).

The communication module 7 contains electronics which communicate via a databus with, for example, a higher-level programmable logic controller (PLC) or a switching device unit with a communication capability and of the same design in the switchboard. This may be busneutral communication with an actuator-sensor interface. The databus and the electrical supply to the electronics in the case of the embodiment according to FIG. 1 are provided via a cable with a bus connector, which can be plugged at the front onto the plug-in slot 21 of the communication module 7. Status displays relating to the switching state of the switching devices, as well as control elements, for example, are provided in a window 22 on the front of the communication module 7.

As an alternative to the connection of a bus connector, a solution is also conceivable in which the electrical connection to the electronics in the communication module 7 is made, for example via shape-coded bus cables. These are pushed into the communication module 7, contact cutters, blades or spikes penetrating the insulating outer covering until contact is made with the cable conductors.

Figure 2:
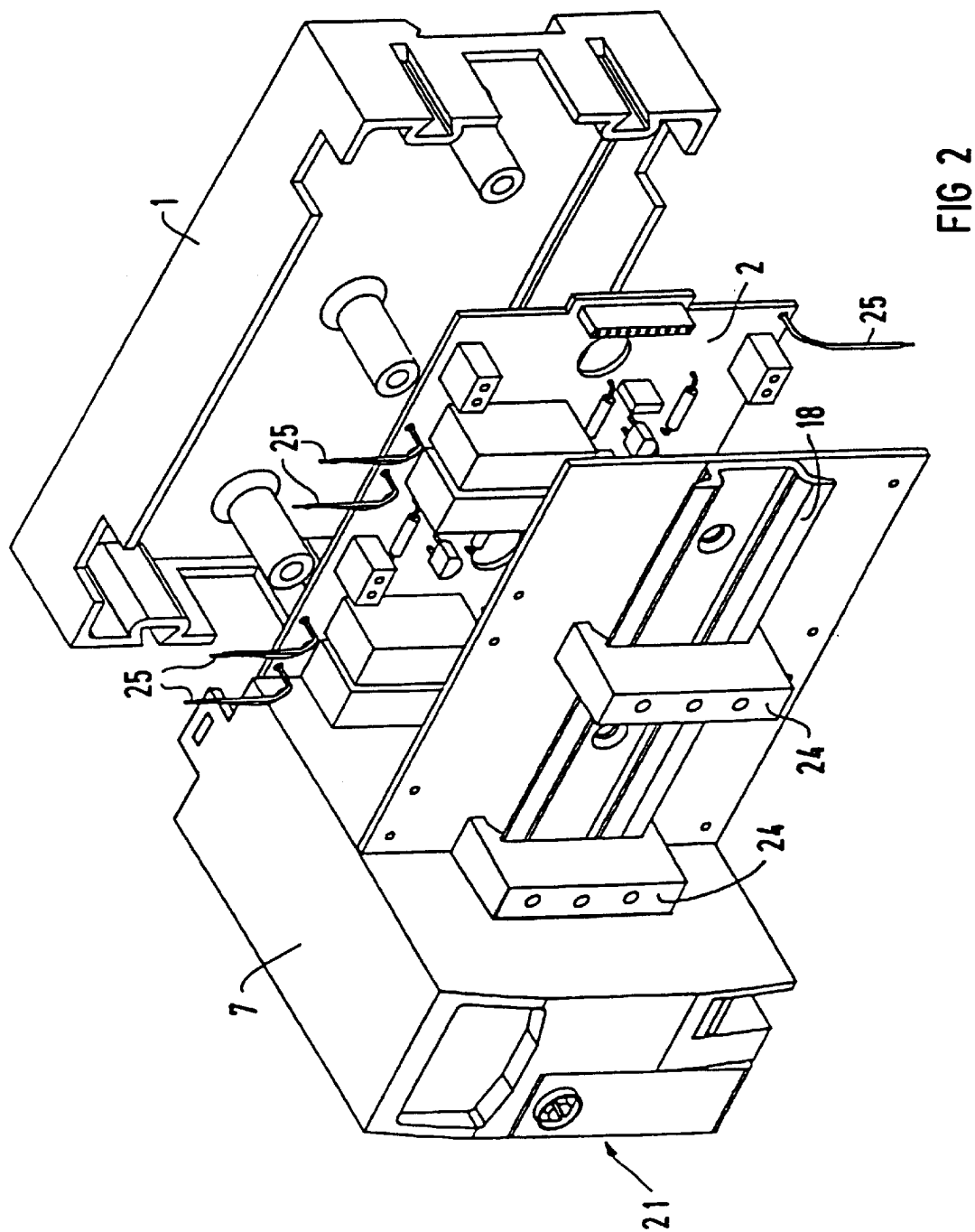
FIG. 2 shows the switching device unit according to FIG. 1 in the partially assembled state.
Figure 3:
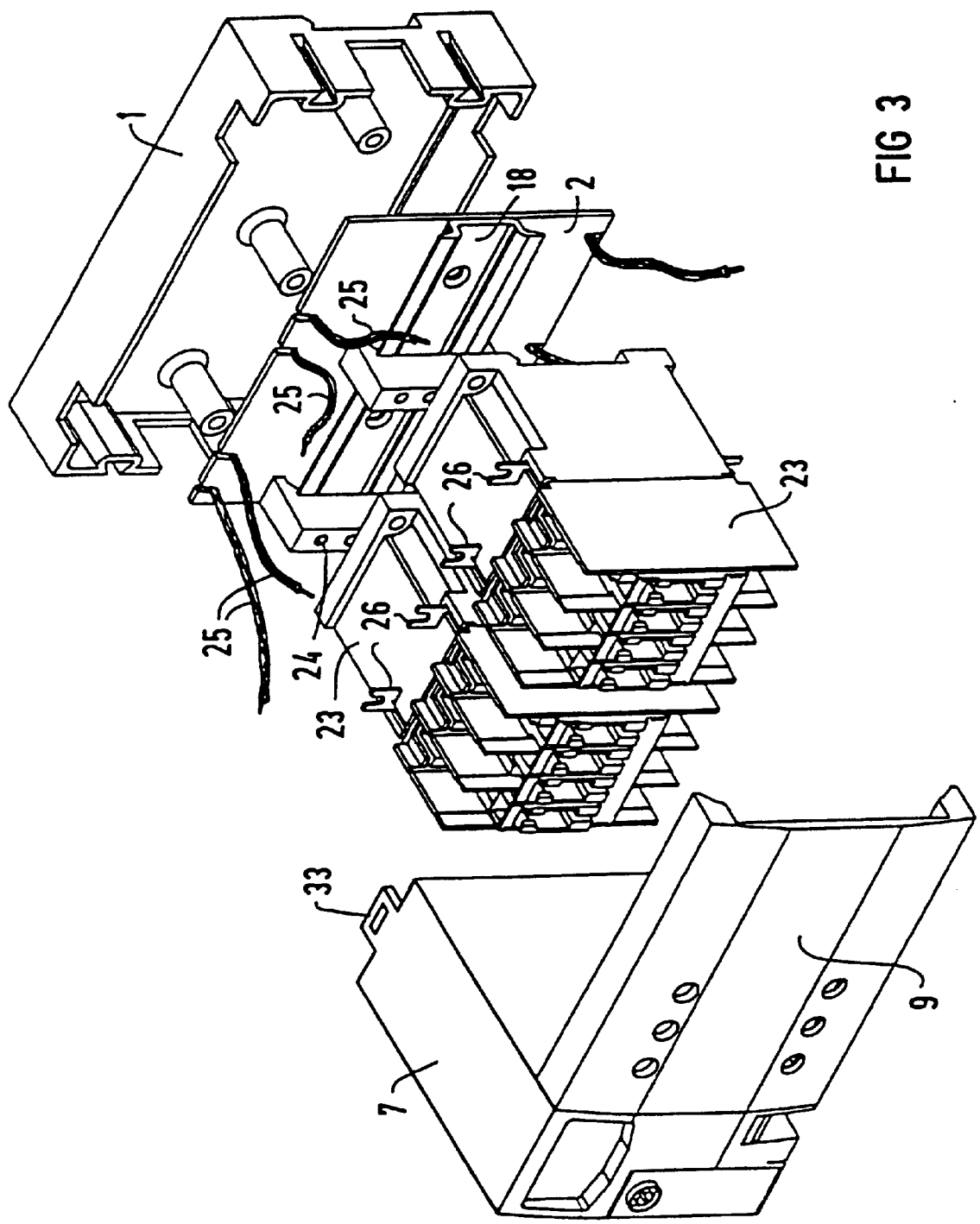
FIG. 3 shows a switching device unit having two contactors in an illustration which shows the mounting.

FIG. 2 shows the switching device unit according to FIG. 1, the communication module 7 being electrically connected via its male strip connector 20 and the strip connector 17 to the electrical circuit on the printed circuit board 2. Two switching devices 23 can be snapped onto the top-hat rail 18 which is integrated in the covering panel 3, as is illustrated in FIG. 3.

The power amplifiers 16 (see FIG 1), which are arranged on the printed circuit board 2, for energizing the coils in the switching devices 23 (FIG. 3) can be electrically coupled to the coil connections 26 (FIG. 3) by connection with cables 25 once the switching devices 23 have been mounted on the top-hat rail 18. The entire switching device unit can be snapped, via the rear wall of the equipment mount 1, onto a standard profile rail 27 according to FIG. 4.

The top-hat rail 18 is provided with contact blocks 24 with a grid spacing matched to the width of the switching devices 23. These contact blocks 24 are connected to the electrical circuit and are used as an alternative for electrically driving the switching devices 23 which, in order to make contact with the contact blocks 24, have contact pins which project out of their housing at the side but are not illustrated here. When the switching devices 23 are snapped on, these contact pins are held on the top-hat rail 18 by mating contacts of the contact blocks 24.

The switching devices are covered by the front cover 9 or 10 and, at the top and bottom, by in each case one perforated cover 36. The front cover 9, 10 has screwdriver openings 37 aligned with the contact connecting screws (which cannot be seen in the drawing) of the switching devices 23, and the perforated covers 36 are provided with slots 30 aligned with the cable insertion openings of the switching devices 23, to accommodate the incoming and outgoing main electrical power cables.

A control rail 28 is inserted into the standard profile rail 27. The control rail 28 in this case has two data lines 29 and two supply lines 29, for example for connection to a DC voltage of 24 V. In this embodiment, there is therefore no need for any connection capability for a bus connector to the communication module 7 according to FIG. 1, that is to say there is no corresponding plug-in slot 21.

Further details relating to how contact is made between the switching device unit and the control rail 28 can be found in FIG. 5, which shows the rear of the equipment mount 1 of the switching device unit. Sprung contact studs or contact pins 32 are provided for making contact, adequate contact reliability for the contact with each current path being ensured by in each case two laterally offset contact studs 32. FIG. 5 also shows a plug-in snap-action plug 39 for mechanical coupling of the communication module 7, as well as latching elements in the form of latching projections 34 and slides 35 for latching with a standard profile rail 27.

Figure 4:
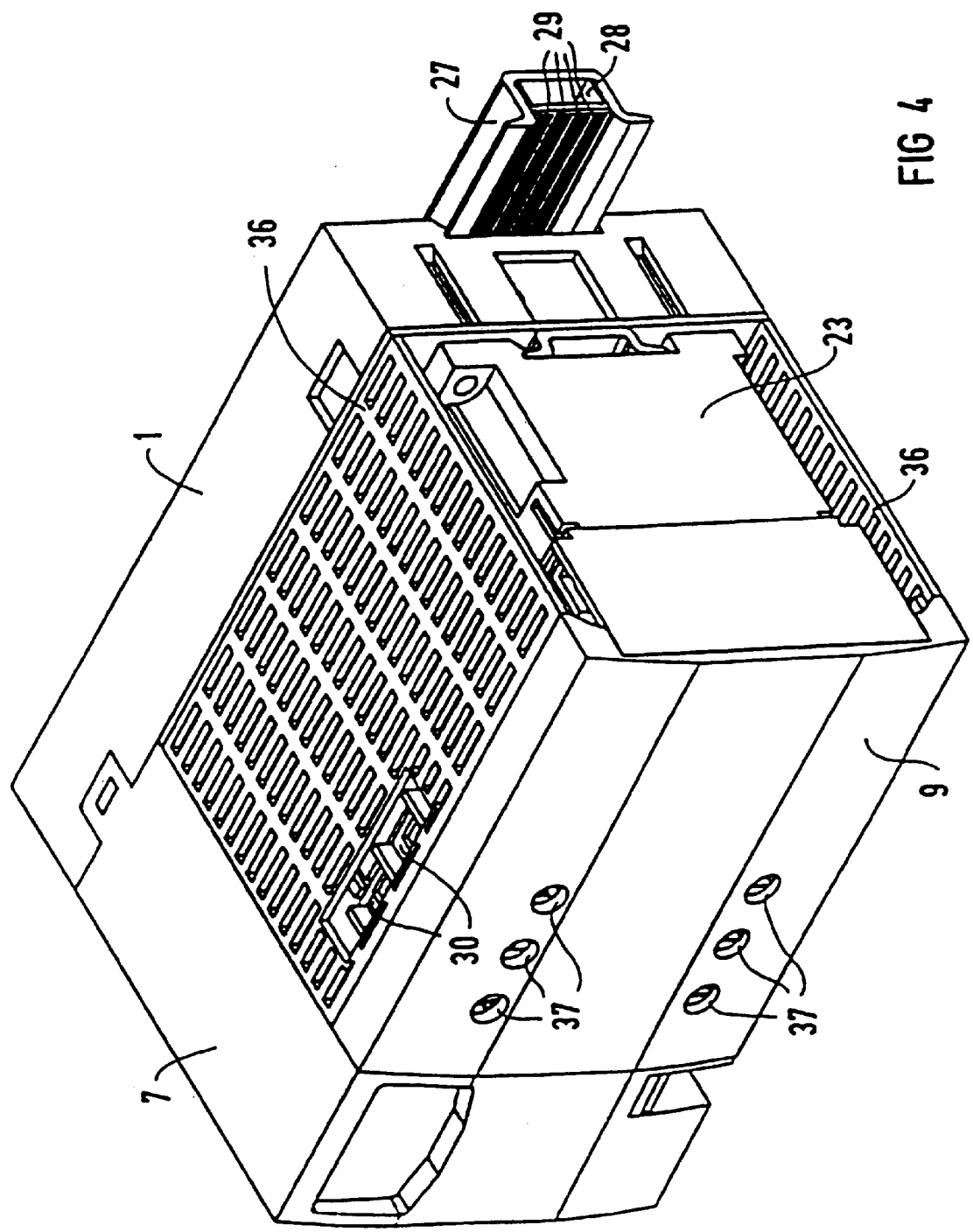
FIG. 4 shows a switching device unit which is snapped onto a standard profile rail with an inserted control rail.

The switching device unit according to FIG. 4 is designed in the same way as the embodiment according to FIG. 1.

In the case of the switching device unit according to FIG. 2, which is designed with a plug-in slot 21 on the communication module 7, main electrical power connections 38 (FIG. 6), for example for connection to a three-phase busbar system, may be provided on the rear wall of the equipment mount 1, and electrical loads can be connected to them via the switching devices 23.

Figure 6:
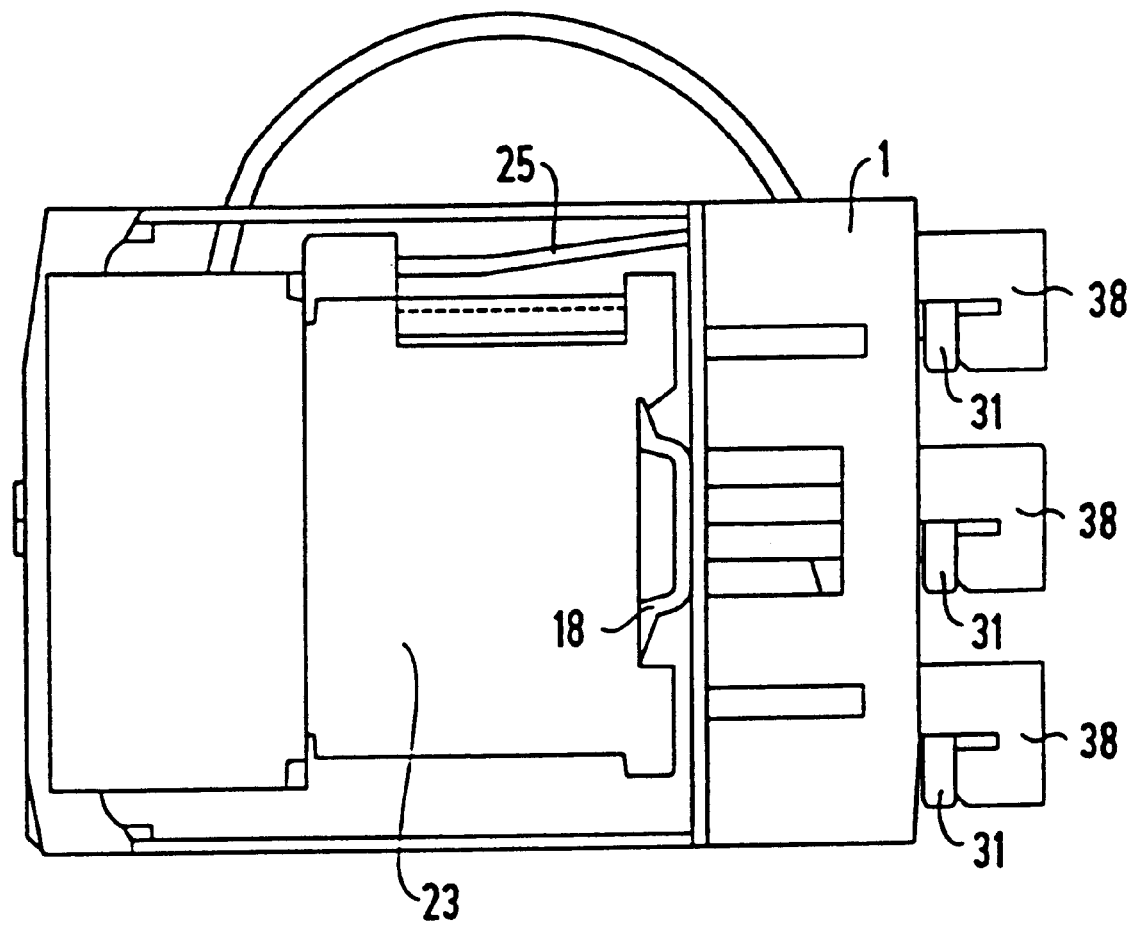
FIG. 6 shows the side view of a switching device unit with main electrical power connections.

Such a switching device unit is at the same time held and made contact with by hooking on the busbars 31, as is illustrated in more detail in FIG. 6. The corresponding internal wiring from the main electrical power connections 38 to the switching devices 23 can be configured by the manufacturer itself, that is to say at the customer need do is to hook the ready-to-operate switching device unit on the busbars 31.

What is claimed is:

1. A switching device unit with a communication capability, comprising:
    an equipment mount;
    a top-hat rail, the top-hat rail being connected to the equipment mount;
    a plurality of electromagnetically-operated switching devices mounted on the top-hat rail; and
    a communication unit, the communication unit being held on the equipment mount, the communication unit including plug contacts which are connected to the switching devices.

2. The switching device unit of claim 1, wherein:
    the equipment mount includes a rear, and wherein the rear includes electrical connections, the electrical connections being adapted for electrical connection to busbars, to which electrical loads can be connected via the switching devices.

3. The switching device unit of claim 1, wherein:
    the communication unit includes a plug-in slot for connection to a bus connector.

4. The switching device unit of claim 1, further comprising:
    a printed circuit board connected to the equipment mount, the printed circuit board including electrical components.

5. The switching device unit of claim 1, further comprising:
    an equipment mount expansion part, the equipment mount expansion part including an expansion rail, and further including at least one further switching device mounted on the expansion rail, the further switching device being connected to the communication unit, whereby the switching device unit can be expanded in a modular manner.

6. A switching device unit with a communication capability, comprising:
    an equipment mount, wherein the equipment mount includes first electrical contacts and at least one latching element, wherein the at least one latching element is adapted to be connected to a standard profile rail, and wherein the first electrical contacts are adapted to automatically make contact with data and supply lines integrated in the standard profile rail;
    a top-hat rail, the top-hat rail being connected to the equipment mount;
    a plurality of electromagnetically-operated switching devices mounted on the top-hat rail; and a communication unit, the communication unit being held on the equipment mount, the communication unit including plug contacts which are connected to the switching devices.

7. A switching device unit with a communication capability, comprising:

an equipment mount;

a top-hat rail, the top-hat rail being connected to the equipment mount;

a plurality of electromagnetically-operated switching devices mounted on the top-hat rail;

a communication unit, the communication unit being held on the equipment mount, the communication unit including plug contacts which are connected to the switching devices;

a printed circuit board connected to the equipment mount, the printed circuit board including electrical components, wherein the equipment mount is in the shape of a trough, and wherein the printed circuit board is accommodated in the trough; and a covering panel which is mounted on the equipment mount and which covers the printed circuit board.

8. The switching device unit of claim 7, wherein:

the rail is mounted on an outside of the covering panel.

9. A switching device unit with a communication capability, comprising:

an equipment mount;

a top-hat rail, the top-hat rail being connected to the equipment mount;

a plurality of electromagnetically-operated switching devices mounted on the top-hat rail; and a communication unit, the communication unit being held on the equipment mount, the communication unit including plug contacts which are connected to the switching devices, wherein the communication unit is mounted on the equipment mount by a detachable plug-in snap-action connection.

10. A switching device unit with a communication capability, comprising:

an equipment mount;

a top-hat rail, the top-hat rail being connected to the equipment mount;

a plurality of electromagnetically-operated switching devices mounted on the top-hat rail; and a communication unit, the communication unit being held on the equipment mount, the communication unit including plug contacts which are connected to the switching devices, wherein the switching devices include contact pins, the switching device unit further including contact blocks including mating contacts, the contact pins contacting the mating contacts to thereby provide an electrical connection between the switching devices and the communication unit.

* * * * *